April 11, 1939.　　　L. A. PHILIPP　　　2,153,696
AIR CONDITIONING SYSTEM
Original Filed Feb. 3, 1934
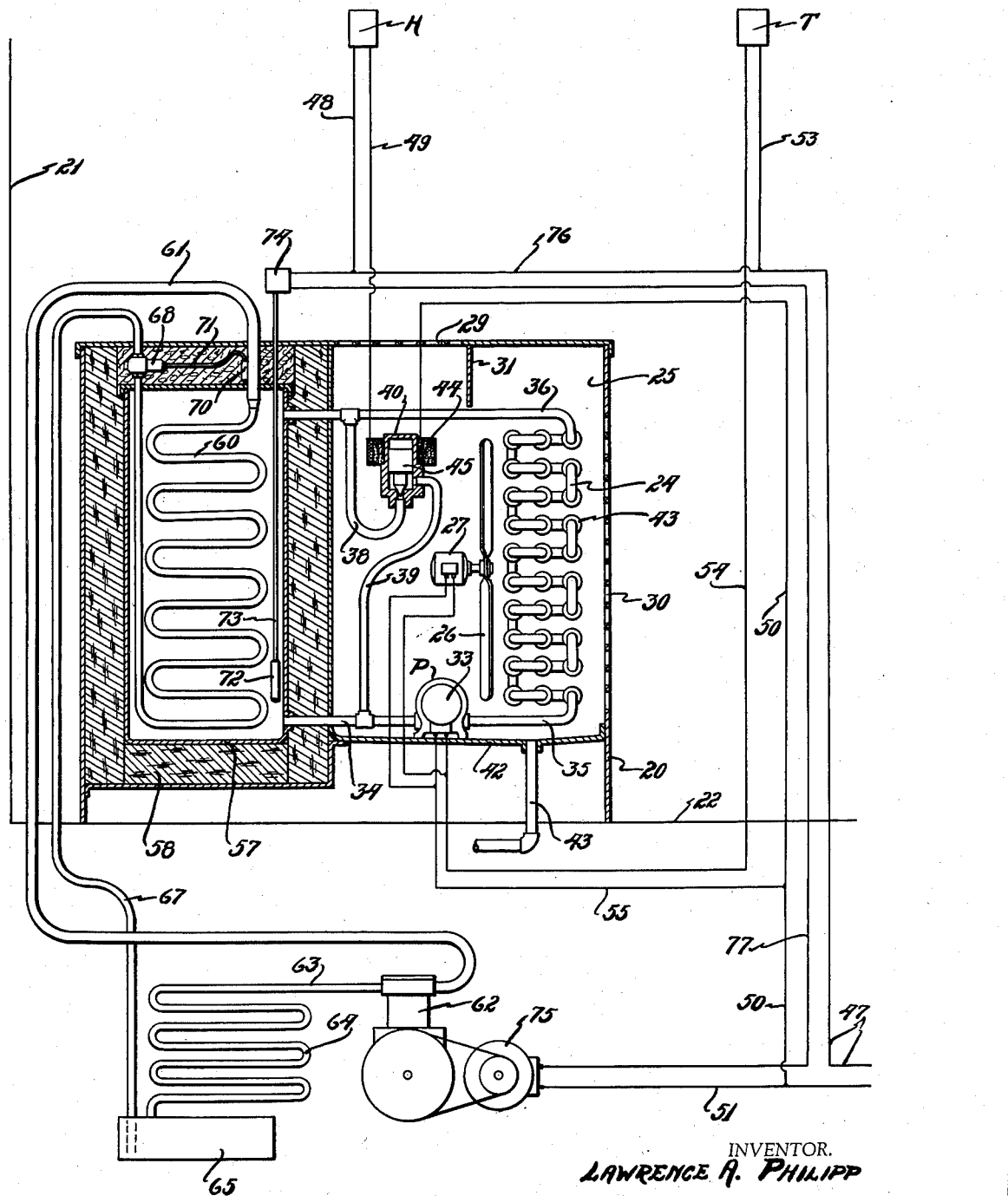
INVENTOR.
LAWRENCE A. PHILIPP
BY
ATTORNEY.

Patented Apr. 11, 1939

2,153,696

UNITED STATES PATENT OFFICE 2,153,696

AIR CONDITIONING SYSTEM

Lawrence A. Philipp, Detroit, Mich., assignor, by mesne assignments, to Nash-Kelvinator Corporation, Detroit, Mich., a corporation of Maryland Application February 3, 1934, Serial No. 709,660
Renewed October 21, 1937

4 Claims. (Cl. 62—6)

The present invention relates to refrigeration and particularly to the method of and apparatus for cooling and dehumidifying air.

One of the objects of the present invention is to provide an improved method of and apparatus for conditioning air, utilizing a refrigerant medium by-pass for returning a part of the refrigerant to a heat absorber without recooling the same and controlling the flow of refrigerant through the by-pass in accordance with the relative humidity of the air to be conditioned.

In conjunction with the above object, it is a further object of the present invention to control the heat exchange between the heat absorber and the air circulating thereover in accordance with the temperature of the air to be conditioned.

Other and further objects and advantages will be apparent from the following disclosure, reference being had to the accompanying drawing wherein a preferred form of embodiment of the present invention is clearly shown.

In the drawing:

The figure in the drawing is a diagrammatic view of the improved refrigerating system applied to an air conditioning cabinet. Referring to the drawing there is shown a cabinet 20 disposed within a room in which 21 indicates a side wall thereof and 22 the floor. A heat absorber 24 is disposed in one compartment 25 of the cabinet and air is forced over the absorber 24 by a fan 26 driven by a motor 27. This air is drawn into the cabinet from the room through a top opening 29 in the cabinet and is expelled through a side opening 30. A wall 31 directs the air within the cabinet. Refrigerating medium is forced through the absorber 24 by a pump P driven by a motor 33. Cold refrigerant is conducted to the pump P by a pipe 34 and forced into the absorber through the pipe 35. The refrigerating medium is conducted from the absorber through a pipe 36. A conduit comprising pipes 38 and 39 interconnects pipes 36 with pipe 34 and the flow of refrigerating medium through this conduit is controlled by a magnetic valve 40.

Cold refrigerating medium is conducted from a suitable source of supply through pipes 34 and 35 to the absorber 24 by the pump P and relatively warm refrigerating medium is returned to the source of supply by the pipe 36. Air flowing over the heat absorber 24 will be cooled below the dew point and thereby cause precipitation of moisture from the air. This moisture will drop to the drip pan 42 and will then be conducted by a drain pipe 43 from the cabinet 20. Fins 43 are attached to runs of the absorber to increase the heat absorbing surface of the absorber. When the relative humidity of the air in the room is reduced to the desired minimum, it may be desirable to continue cooling the air without materially lowering the relative humidity of the air in the room. In order to accomplish this I provide for increasing the temperature of the absorber and this is done by re-circulating at least a part of the refrigerating medium without recooling the same. For this purpose I provide a humidostat H which is arranged to open the valve 40 when the relative humidity of the air in the room is down to the predetermined desired minimum. When the valve 40 is open, part of the refrigerating medium will by-pass the source of supply of the cold refrigerating medium through the pipes 38 and 39. The magnetic valve 40 includes a coil 44 and a solenoid core 45 which functions as a valve. The circuit from the magnetic coil 44 includes wires 47 and 48, humidostat H, wire 49, coil 44, wires 50 and 51.

From the foregoing it will be seen that when the relative humidity of the air to be conditioned is above a predetermined minimum, relatively cold refrigerating medium will circulate through the heat absorber 24 to cause the desired precipitation of moisture from the air and, when the relative humidity of the air has been reduced to the desired minimum, the humidostat H will operate to open the valve 40 and thereby cause a return to the absorber of a part of the warm refrigerating medium.

In addition to controlling the relative humidity of the air in the room, it is also desirable to control the temperature of this air and in order to accomplish this I control the heat exchange between the circuiting air and the absorber by controlling the circulation of refrigerating medium through the absorber 24. A thermostat T is also disposed in the room and controls the starting and stopping of the motor 33 from the pump P. The circuit for the motor 33 includes wires 47 and 53, thermostat T, wire 54, motor 33 and wires 55, 50 and 51. This thermostat is set so as to interrupt the pump motor circuit when the temperature of the air in the room is reduced to a predetermined minimum and is arranged to complete the circuit to the motor 33 when the air in the room attains a predetermined high temperature. Thus the air in the room is maintained between predetermined high and low temperature limits and moisture is removed therefrom in accordance with the relative humidity.

The source of cold refrigerating medium is herein shown as comprising a tank 57 containing a cooling liquid such as water. This tank is contained within the cabinet 20 and is insulated by walls 58. The pipe 34 receives the liquid from the bottom of the tank and the warm refrigerating medium is discharged into the top of the tank. The means for cooling the liquid in tank 57 is herein shown as comprising a mechanical refrigerator. This refrigerator includes an evaporator 60 disposed within the liquid in tank 57. Gaseous refrigerant is withdrawn from the evaporator 60 through the pipe 61 by a compressor 62. This gaseous refrigerant is compressed within compressor 62 and is conducted by a pipe 63 to a condenser 64 wherein it is cooled and liquefied and passes to a liquid receiver 65. The liquid refrigerant is conducted from the receiver 65 by a pipe 67 to an expansion valve 68 and from the expansion valve the refrigerant is directed directly to the evaporator 60. Any suitable expansion valve may be employed and I have herein shown an automatic valve which is known in the art as a thermostat control expansion valve. In this type of valve the flow of refrigerant therethrough is controlled by the pressure within the evaporator augmented by the temperature at the outlet of the evaporator, that is, refrigerant passes therethrough into the evaporator when the pressure within the evaporator is reduced to a predetermined minimum but as soon as vaporization takes place at the outlet of the evaporator, the flow of refrigerant through the valve is stopped or restricted. For this purpose there is provided a bulb 70 and a tube 71 which contain a volatile fluid. When refrigerant vaporizes at the outlet of the evaporator the pressure of the volatile fluid in bulb 70 and tube 71 is decreased sufficiently to close or partly close the expansion valve 68.

In actual practice the compressor is maintained in operation until a quantity of ice forms about the evaporator but is rendered inoperative before sufficient ice has accumulated to impede the circulation of water therethrough. By providing this reserve of ice, under extreme high humidity or temperature conditions or both, the absorber will be maintained cold although the mechanical refrigerating apparatus is of a capacity insufficient to take care of these extreme conditions. In this manner a smaller and less expensive mechanical refrigerating apparatus may be employed. The refrigerating apparatus is controlled by the temperature of the liquid in tank 57. The thermostat 72 is disposed in tank 57 and is connected by a tube 73 with a suitable type of snap switch 74. The thermostat 72 and tube 73 contain an expansible fluid and this system is arranged to control the circuit of a driving motor 75 for the compressor 62. The circuit for the compressor motor 75 includes wires 47 and 76, snap switch 74, wire 77, motor 75 and wire 51. The thermostat and snap switch 74 are set, in the preferred form, to complete the circuit to the motor 75 before all of the ice is melted from the evaporator 60 and is arranged to interrupt the circuit to the motor before sufficient ice is accumulated on the evaporator 60 to impede circulation of liquid therethrough.

From the foregoing it will be seen that the heat absorbed by the absorber 24 will be dissipated by the liquid in tank 57 and the mechanical refrigerator and by this system I have provided for suitably conditioning air of high temperature and high humidity. The motor 27 for driving the fan 26 may be operated continuously but I have shown same connected in parallel with the pump motor 33 so that it operates only when refrigerating medium is being forced by the pump P through the absorber.

While the form of embodiment of the present invention as herein described constitutes a preferred form, it is to be understood that other forms might be adopted, all coming within the scope of the claims which follow.

I claim:

1. An air conditioning system comprising in combination, heat absorbing and heat dissipating means; a conduit for conducting refrigerating medium from the heat dissipating means to the heat absorbing means; a conduit for conducting the refrigerating medium from the heat absorbing means to the heat dissipating means; a by-pass interconnecting said conduits; said heat absorbing means being disposed in the path of the air to be conditioned; and mechanism for maintaining simultaneously the air at the desired temperature and humidity substantially at all times, said mechanism including means responsive to the temperature of the air to be conditioned for controlling the flow of refrigerating medium through said heat absorbing means, and means responsive to the relative humidity of the air to be conditioned for controlling the flow of refrigerating medium through said by-pass.

2. An air conditioning system comprising in combination, heat absorbing and heat dissipating means, a conduit for conducting refrigerating medium from the heat dissipating means to the heat absorbing means, a conduit for conducting the refrigerating medium from the heat absorbing means to the heat dissipating means, a pump for circulating refrigerating medium through the circuit, a by-pass interconnecting said conduits, said pump being interposed between the by-pass and the heat absorber, said heat absorbing means being disposed in the path of the air to be conditioned, means responsive to the temperature of the air to be conditioned for controlling the operation of the pump, and means responsive to the relative humidity of the air to be conditioned for controlling the flow of refrigerating medium through said by-pass.

3. The process of cooling and dehumidifying air which comprises circulating a refrigerating medium between a heat absorber and a heat dissipator, causing air to circulate about the heat absorber, controlling the flow of refrigerating medium through the heat absorber in accordance with the temperature of the air to be conditioned, and by-passing a portion of the refrigerating medium about the heat dissipator when the relative humidity of the air to be conditioned is below a predetermined desired minimum.

4. The process of conditioning air which comprises circulating a refrigerating medium between a heat absorber and a heat dissipator; causing air to circulate about the heat absorber; simultaneously maintaining the air at a desired temperature and humidity substantially at all times by controlling the flow of refrigerating medium through the heat absorber in accordance with the temperature of the air and varying, in accordance with the relative humidity of the air, the proportionate quantity, of the refrigerant medium being circulated, which passes through and which by-passes the heat dissipator.

LAWRENCE A. PHILIPP.